(12) United States Patent  (10) Patent No.: US 7,531,930 B2
Ward, Sr.  (45) Date of Patent: May 12, 2009

(54) ENERGY PRODUCING MAGNETIC CONVERTER

(76) Inventor: Steven Wayne Ward, Sr., 4650 FM 2666 Rd., Shepherd, TX (US) 77371

( * ) Notice: Subject to any disclaimer, the term of this patent is extended or adjusted under 35 U.S.C. 154(b) by 483 days.

(21) Appl. No.: 11/381,703

(22) Filed: May 4, 2006

(65) Prior Publication Data
US 2007/0257578 A1 Nov. 8, 2007

(51) Int. Cl.
*H02K 49/00* (2006.01)
(52) U.S. Cl. .................... 310/103; 310/268
(58) Field of Classification Search ......... 310/103–106, 310/113–115, 254, 268, 156.32–156.34, 310/261
See application file for complete search history.

(56) References Cited

U.S. PATENT DOCUMENTS

| 3,089,044 | A | * | 5/1963 | Bolton | 310/36 |
| 3,665,227 | A | * | 5/1972 | Busch | 310/46 |
| 3,683,249 | A | * | 8/1972 | Shibata et al. | 318/730 |
| 4,082,969 | A | * | 4/1978 | Kelly | 310/103 |
| 4,093,897 | A | * | 6/1978 | Fujita et al. | 318/400.04 |
| 4,375,047 | A | * | 2/1983 | Nelson et al. | 318/48 |
| 4,486,675 | A | * | 12/1984 | Albert | 310/46 |
| 5,278,470 | A | * | 1/1994 | Neag | 310/178 |
| 5,760,506 | A | * | 6/1998 | Ahlstrom et al. | 310/74 |
| 5,793,136 | A | * | 8/1998 | Redzic | 310/114 |
| 6,114,788 | A | * | 9/2000 | Vuillemin (Muller) et al. | 310/90.5 |
| 6,208,055 | B1 | * | 3/2001 | Takahashi | 310/156.01 |
| 6,633,106 | B1 | * | 10/2003 | Swett | 310/268 |

* cited by examiner

*Primary Examiner*—Thanh Lam
(74) *Attorney, Agent, or Firm*—Mary J. Sims

(57) ABSTRACT

An energy producing magnetic converter is provided that outputs both electrical and mechanical energy. The converter includes a controller assembly rotatably secured between a plurality of field coil assemblies and a plurality of magnets. During a rotation of the controller assembly between the plurality of field coil assemblies and the plurality of magnets, electric current is generated in wire coils of the field coil assemblies, and counter-magnetic fields are induced around the wire coils. A pole of each counter-magnetic field is formed on the controller assembly, and counterforce present between magnetic fields of the plurality of magnets and the counter-magnetic fields cause and maintain forward rotational motion in the energy producing magnetic converter. Accordingly, because the forward rotational motion is maintained in the presence of sufficient counterforce, the magnetic converter outputs torque in addition to the electric current, thereby increasing an efficiency of the magnetic converter.

20 Claims, 5 Drawing Sheets

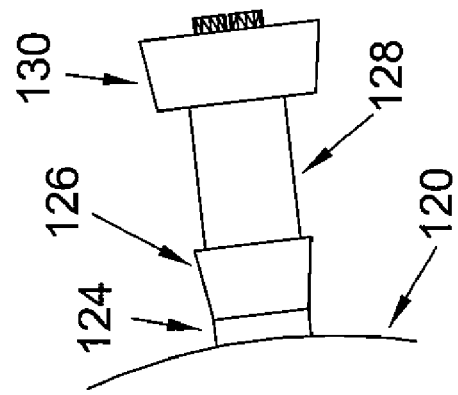
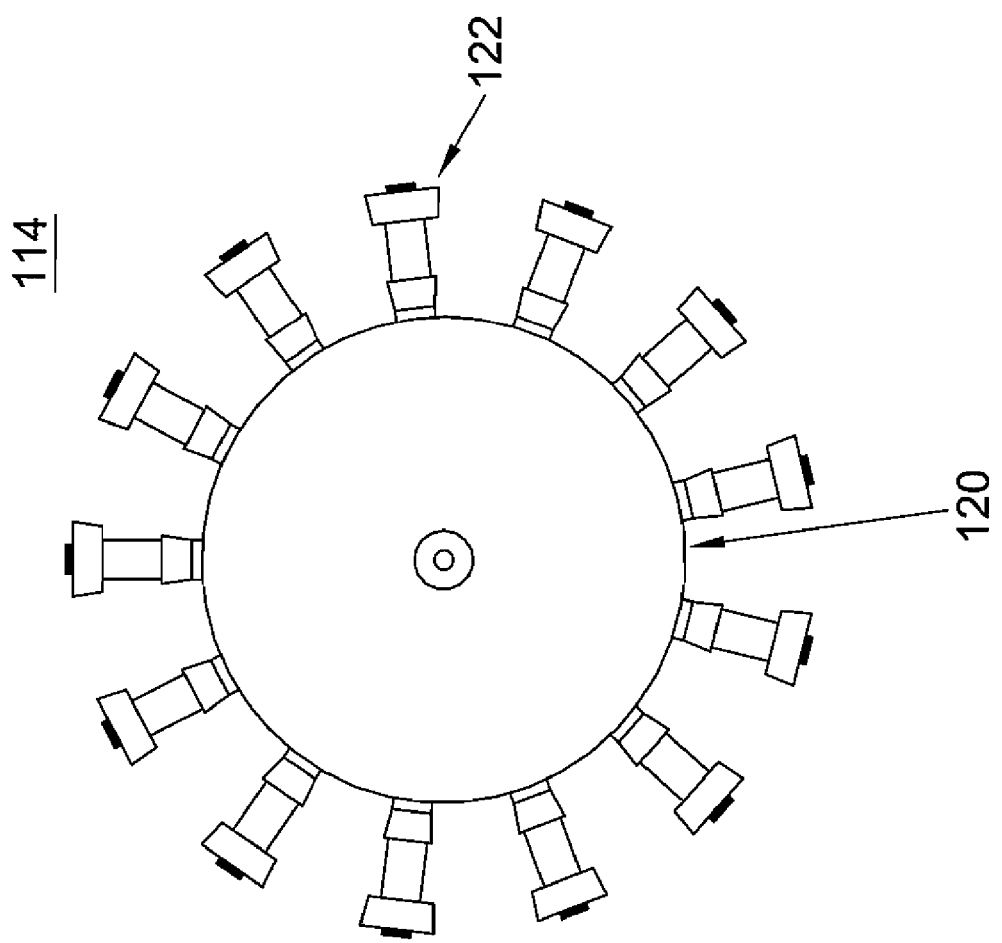
FIG. 2b
FIG. 2a

ENERGY PRODUCING MAGNETIC CONVERTER

BACKGROUND OF INVENTION

1. Technical Field

The invention relates generally to the subject of converters and power supplies, and, in particular, to devices that generate usable electrical and/or mechanical energy through the use of magnetic fields.

2. Background Art

Magnetic converters, or, devices that produce usable electrical and/or mechanical energy through the use of magnetic fields, or flux, are well known in the art. Some examples of magnetic converters include electric motors, electric generators, transformers, etc. A typical magnetic converter includes at least a pair of permanent magnets and a wire coil free to rotate between the magnets. The magnets are generally connected by a steel former and the wire coil is connected to lead wires using brushes. In a magnetic converter that is used to generate usable mechanical energy, the wire coil may be further connected to a drive shaft.

In a magnetic converter that is used to generate mechanical energy, e.g., an electric motor, a voltage potential is applied across the lead wires, thereby causing an electric current to flow through the coil. The flow of the electric current induces a magnetic field, or flux, around the coil. The coil's magnetic field repels and attracts the magnetic field generated by the permanent magnets, which, in turn, causes the wire coil to rotate. Accordingly, usable rotational mechanical energy, or torque, may be drawn from the drive shaft.

In a magnetic converter that is used to generate electrical energy, e.g., an electric generator, the wire coil is rotated in a magnetic field generated by the permanent magnets, thereby inducing a voltage in the wire coil. Accordingly, when the lead wires are connected to a load, e.g., a light bulb, electric current may be drawn from the coil. Consequently, once current begins to flow through the rotating wire coil, a force opposing the motion of the wire coil is also induced, thereby making the wire coil harder to turn. Thus, as is explained by the conservation of energy law, the more work that the converter does, the more work that must be put into its operation. In physical practice, the work put into the operation of the converter is produced by applying a greater mechanical driving force, or increased input torque, to the rotating wire coil.

Accordingly, it would be desirable to provide a magnetic converter for generating electrical energy in which the input torque applied to the magnetic converter need not be increased to maintain operation of the converter. Further, it would be desirable to provide a magnetic converter for generating electrical energy in which an input torque is not required to maintain operation of the converter, and, hence, usable output torque may be drawn from the converter. Advantageously, in such a scheme, the magnetic converter may be used to generate usable electrical and mechanical energy, thereby increasing an efficiency of the magnetic converter.

SUMMARY OF INVENTION

According to one aspect, an energy producing magnetic converter includes a housing; a plurality of field coil assemblies disposed on a first surface of the housing; a plurality of magnets disposed on a second surface of the housing opposite of and aligned with the plurality of field coil assemblies; and a controller assembly rotatably secured to the housing and positioned between the plurality of field coil assemblies and the plurality of magnets, wherein, upon application of an electric load to the plurality of field coil assemblies, a rotation of the controller assembly relative to the plurality of field coil assemblies and the plurality of magnets induces at least one counter-magnetic field for generating an electric current.

According to another aspect, a magnetic converter system includes a plurality of field coil assemblies; a plurality of magnets, each magnet of the plurality of magnets being positioned opposite of and separated from a corresponding field coil assembly of the plurality of field coil assemblies by a spacing interval; a controller assembly having a plurality of controllers, each controller of the plurality of controllers being arranged to pass through the spacing interval between each magnet and the corresponding field coil assembly; and wherein, during a rotation of the controller assembly, a plurality of counter-magnetic fields generated substantially on the plurality of controllers as the plurality of controllers pass through the spacing interval between each magnet and the corresponding field coil assembly generates sufficient counterforce to provide and maintain forward rotational motion to the controller assembly, and wherein the maintaining of the forward rotational motion generates an output torque of the magnetic converter system.

According to another aspect, a method for generating usable electrical energy and usable mechanical energy of a magnetic converter includes rotating a plurality of controllers secured to a controller plate of the magnetic converter between a field coil assembly and an opposing magnet of the magnetic converter; utilizing a counter-magnetic field generated on each controller of the plurality of controllers to produce sufficient counterforce to maintain forward rotational motion of the controller plate and the plurality of controllers; wherein maintaining forward rotational motion of the controller plate and the plurality of controllers generates usable mechanical energy of the magnetic converter, and wherein application of an electric load to the field coil assembly generates usable electrical energy of the magnetic converter.

Other aspects and advantages of the invention will be apparent from the following description and the appended claims.

BRIEF DESCRIPTION OF DRAWINGS

FIGS. 2a and 2b show views of a controller assembly of an energy producing magnetic converter in accordance with an embodiment of the present invention.

DETAILED DESCRIPTION

Embodiments of the present invention will now be described with reference to the above drawings. Like references are used in the figures to represent like elements.

Embodiments of the present invention relate to a method and apparatus for generating electrical and mechanical energy. Embodiments of the present invention further relate to an energy producing magnetic converter, referred to herein as a converter, that generates usable electric current and output torque. The converter is provided with a controller assembly rotatably secured between a plurality of field coil assemblies and a plurality of magnets. During a rotation of the controller assembly between the plurality of field coil assemblies and the plurality of magnets, electric current is generated in wire coils of the field coil assemblies, and counter-magnetic fields are induced around the wire coils. A pole of each counter-magnetic field is formed on the controller assembly, and counterforce present between magnetic fields of the plurality of magnets and the counter-magnetic fields cause and maintain forward rotational motion in the energy producing magnetic converter. Accordingly, because the forward rotational motion is maintained in the presence of sufficient counterforce, the magnetic converter outputs torque in addition to the electric current, thereby increasing an efficiency of the magnetic converter.

Figure 1A:
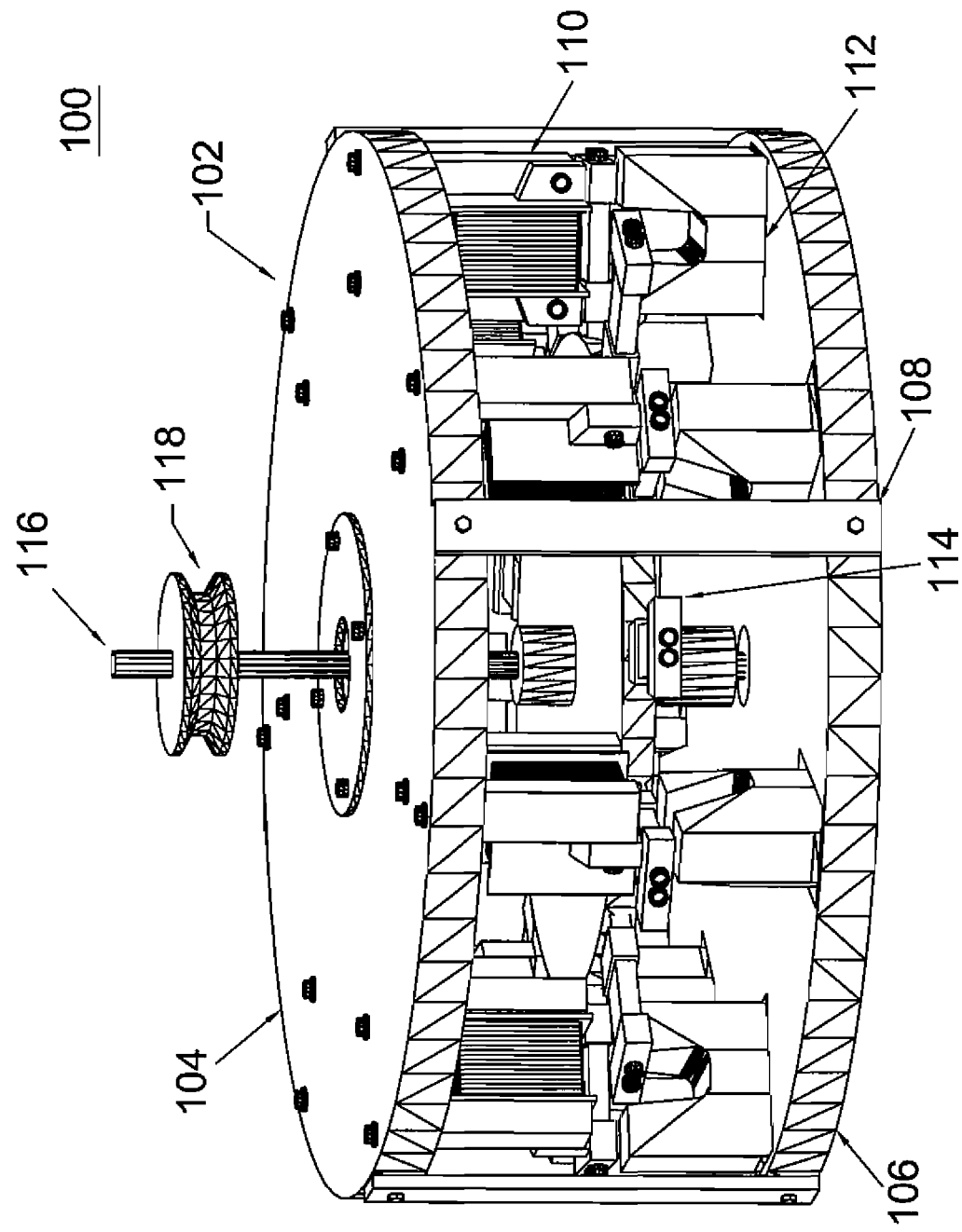
FIGS. 1a and 1b show views of an energy producing magnetic converter in accordance with an embodiment of the present invention.
Figure 1B:
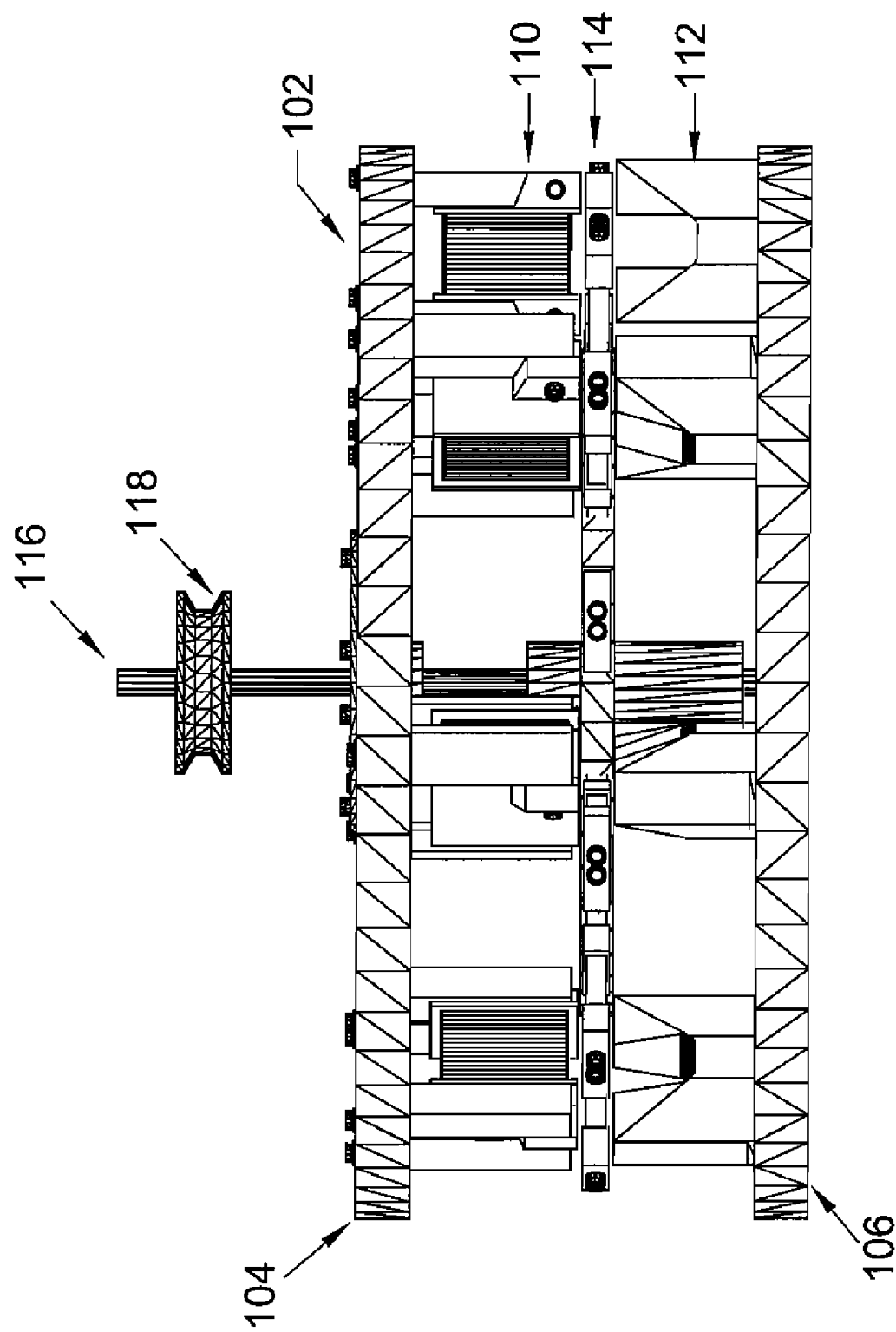

FIGS. 1a and 1b show exemplary views of an energy producing magnetic converter (100), herein referred to as converter (100). In FIG. 1a, an overview of the converter (100) is shown. In FIG. 1b, a side perspective view of the converter (100) is shown.

Referring to FIG. 1a, the converter (100) includes a housing (102) having a first plate (104), or surface, and a second plate (106), or surface. The first plate (104) and the second plate (106) are connected and supported using a plurality of housing brackets (108). Those skilled in the art will appreciate that, although the first plate (104), the second plate (106), and the plurality of housing brackets (108) are shown as separate elements, alternatively, they may be formed as a single element with at least first and second opposing surfaces.

Disposed along a lower surface of the first plate (104) are a plurality of field coil assemblies (110). Each of the plurality of field coil assemblies (110) is operatively connected to a set of lead wires (not shown) that may be connected to an electric load (not shown). Further, disposed along an upper surface of the second plate (106) are a plurality of magnets (112). As shown, each of the plurality of magnets (112) is positioned opposite of and aligned with a corresponding field coil assembly of the plurality of field coil assemblies (110). In some embodiments, each of the plurality of magnets (112) is a substantially horse-shoe shaped permanent magnet.

Positioned between the plurality of field coil assemblies (110) and the plurality of magnets (112) is a controller assembly (114). The controller assembly (114) is rotatably secured to the housing (102) using a drive shaft (116). The drive shaft (116) is positioned along centrally defined axes of the first plate (104) and the second plate (106) of the housing (102). Further, the drive shaft (116) is operatively coupled to the housing (102) in a manner that allows the drive shaft (116) to rotate without transmitting such rotation to the housing (102), the plurality of field coil assemblies (110), or the plurality of permanent magnets (112). Thus, the controller assembly (114) is free to rotate relative to the plurality of field coil assemblies (110) and the plurality of magnets (112) when the electric load is applied to the plurality of field coils (110).

In addition, secured around the drive shaft (116) and outboard of the housing is a pulley (118). In some embodiments, the pulley (118) may be connected to a torque-supplying device, e.g., a starter or a motor (not shown), in order to initiate a rotation of the drive shaft (116), and, hence, of the controller assembly (114). Note that, as will be described below with respect to the operation of the converter (100), torque need not be continually supplied to maintain operation of the converter (100).

Referring to FIG. 1b, a side perspective view of the converter (100) is shown. Note that, in this view, the plurality of housing brackets (108) are not shown in order to aid in the understanding of the invention. In particular, a cross-sectional character of the converter (100) is visible. Further, as is also more easily visible, a small separation space exists between the controller assembly (114) and each of the plurality of field coil assemblies (110), thereby ensuring that the rotation of the controller assembly (114) is not transmitted to the plurality of field coil assemblies (110). In addition, a similar separation space exists between the controller assembly (114) and each of the plurality of magnets (112) to ensure that the rotation of the controller assembly (114) is not transmitted to the plurality of magnets (112).

FIGS. 2a and 2b show exemplary views of the controller assembly (114) of the converter (100). FIG. 2a shows a top view of the controller assembly (114), and FIG. 2b shows a sectional view of the controller assembly (114).

Referring to FIG. 2a, the controller assembly (114) includes a controller plate (120) and controllers (122). The controllers (122) are arranged around a perimeter of the controller plate (122) and are positioned in substantially equally spaced intervals. In some embodiments, a set of thirteen controllers (122) is used in the controller assembly (114). Those skilled in the art, however, will appreciate that a number of controllers (122) used in the invention may be altered without departing from the scope of the invention. Those skilled in the art will also appreciate that a spacing of the controllers (122) may be altered without departing from the scope of the invention.

Referring to FIG. 2b, a sectional view of the controller assembly (114) is shown. In order to aid in the understanding of the invention, only a portion of the controller plate (120) and a single controller (122) are shown in this view. The controller (122) includes the following: first and second spacers (124,128), and first and second magnetic sections (126, 130). A first surface of the first spacer (124) is secured to the controller plate (120), and a second surface of the first spacer (124) is secured to a first surface of the first magnetic section (126). A second surface of the first magnetic section (126) is secured to a first surface of the second spacer (128), and a second surface of the second spacer (128) is secured to a surface of the second magnetic section (130). In some embodiments, the first and second spacers (124, 128) are formed from a non-magnetic material such as aluminum, brass, or hard plastic. Also, in some embodiments, the first and second magnetic sections (126, 130) are formed from a magnetic field transmitting material such as steel.

Figure 3:
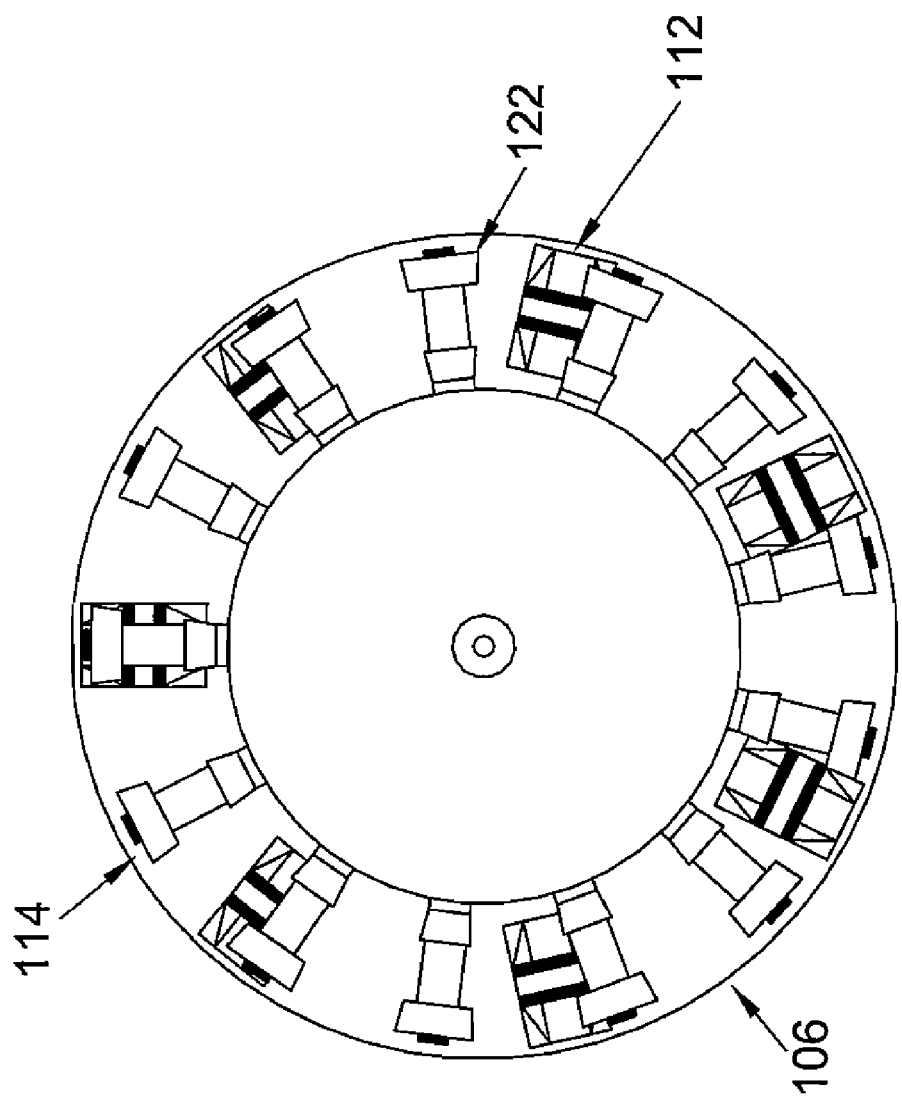
FIG. 3 shows a top view of a portion of an energy producing magnetic converter in accordance with an embodiment of the present invention.

FIG. 3 shows a top view of a portion of the converter (100). Only the controller assembly (114), the plurality of permanent magnets (112), and the second plate (106) are shown in order to aid in the understanding of the layout of the converter (100). In particular, a layout of the plurality of magnets (112), and, hence, their corresponding plurality of field coil assemblies (110, not shown), can be determined. Further, an alignment of the controllers (122) of the controller assembly (114) with the plurality of magnets (112) is illustrated.

Referring to FIG. 3, each of the plurality of magnets (112) is disposed along the second plate (106) in substantially equally spaced intervals. In some embodiments, seven magnets are used as the plurality of magnets (112). Further, because each of the magnets (112) is disposed opposite of and aligned with a corresponding field coil assembly, an equal number of field coil assemblies (110) is utilized. Thus, in some embodiments, seven field coil assemblies are used as the plurality of field coil assemblies (110).

Further, note that each of the controllers (122) is disposed such that, during the rotation of the controller assembly (114), the first and second magnetic sections (126, 130) of at least one controller (122) passes over at least one of the plurality of magnets (112). In particular, in embodiments where the at least one of the plurality of magnets (112) is a horse-shoe shaped permanent magnet, the first magnetic section (126) will pass over a first leg of the magnet (112), and the second magnetic section (130) will pass over a second leg of the magnet. In addition, although not shown, both the first and second magnetic sections (126, 130) pass beneath the magnet's corresponding field coil assembly.

Those skilled in the art will appreciate that a number of permanent magnets, and, hence, a number of corresponding field coil assemblies used in the invention may be altered without departing from the scope of the invention. Those skilled in the art will also appreciate that a spacing of the plurality of magnets (112) and the plurality of field coil assemblies (110) may be altered without departing from the scope of the invention.

Figure 4B:
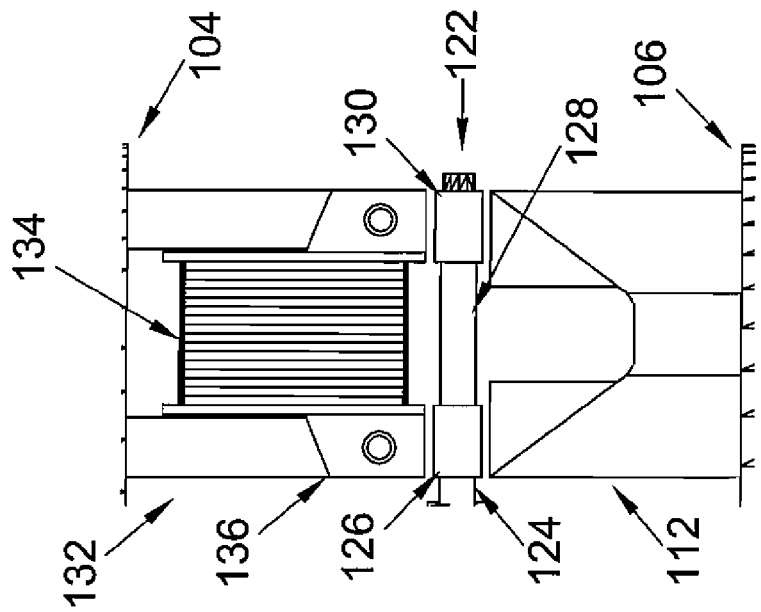
FIGS. 4a and 4b show views of a section of an energy producing magnetic converter in accordance with an embodiment of the present invention.
Figure 4A:
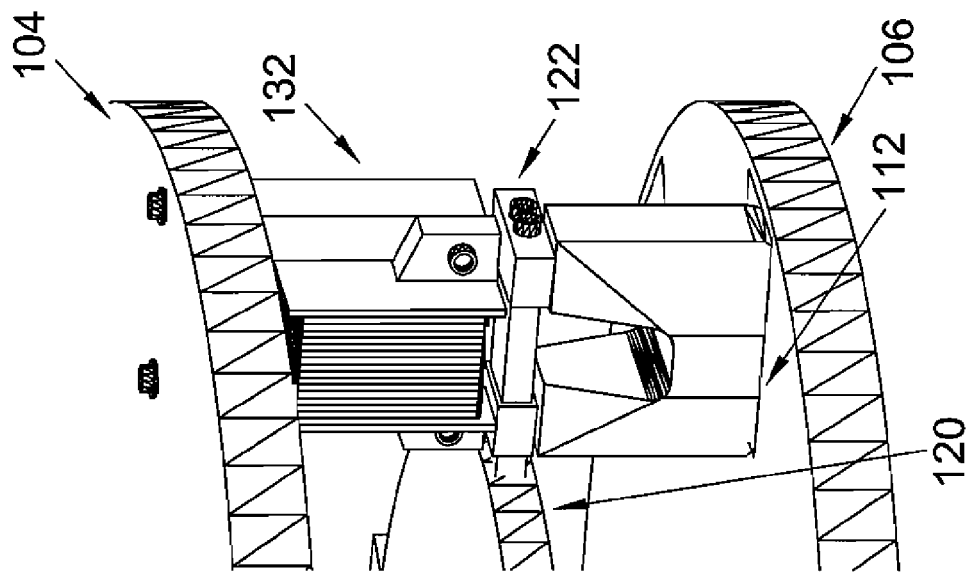

FIGS. 4a and 4b show exemplary views of a section of the converter (100). FIG. 4a shows a perspective view of said section, and FIG. 4b shows a side view of said section. Only a portion of the first and second plates (104,106), a portion of the controller assembly (114), one of the plurality of magnets (112), and a single field coil assembly (132) are shown in order to aid in the understanding of the layout of the converter (100). Referring to FIG. 4a, the controller plate (120) of the controller assembly (114) has been rotated such that one of the controllers (122) has come into alignment with one of the plurality of magnets (112) and the corresponding field coil assembly (132). As can be seen, the controller (122) passes across the magnet (112) and the field coil assembly (132) and through a spacing interval separating the magnet (112) from the field coil assembly (132).

Referring to FIG. 4b, a side view of the layout illustrated in FIG. 4a is shown. As can be seen and as is described for FIG. 1b, a separation space exists between the controller (122) and the field coil assembly (132), as well as a separation space between the controller (122) and the magnet (112). Thus, the controller (122) is able to freely rotate through the spacing interval between the field coil assembly (132) and the magnet (112) without transmitting that rotation or friction to the field coil assembly (132) and/or the magnet (112). Accordingly, the field coil assembly (132) and the magnet (112) remain stationary with respect to each other and the controller (122) during an operation of the converter (100).

Referring again to FIG. 4b, the field coil assembly includes a wire coil (134) supported and secured to the first plate (104) of the housing (102) using support brackets (136) disposed on opposing faces of the wire coil (136). Those skilled in the art will appreciate that although a pair of support brackets (136) are shown, a number and/or configuration of the support brackets may be altered without departing from the scope of the invention. Further, as described above for FIG. 1a, the wire coil (134) is connected to the set of lead wires (not shown) which, in turn, are connected to the electric load (not shown) during the operation of the converter (100)

While the controller (122) is in alignment with the field coil assembly (132), the first and second magnetic sections (126, 130) are positioned beneath the support brackets (136), and, thus, outboard a perimeter of the wire coil (134). At the same time, as mentioned above, the first and second magnetic sections (126, 130) are aligned with the first and second legs of the magnet (112). Further, the first spacer (124) is positioned outboard of field coil assembly (132) and the magnet (112), while the second spacer (128) is positioned beneath and is aligned with the wire coil (134).

Operation

An operation of the converter (100) will now be described with reference to the figures and the above description.

With reference to FIGS. 1a and 4b, upon application of the electric load (not shown) to the wire coil (134), the required input torque to the converter (100) decreases from idle. Idle on the converter (100) is defined as an amount of torque required to turn the converter (100) with no electric load applied. Accordingly, a rotation of the drive shaft (116), and, hence, the controller assembly (114) is initiated by an application of torque to the pulley (118). The torque is applied to the pulley (118) by the torque-supplying device, e.g., the starter or the motor (not shown). In some embodiments, the torque-supplying device is a manually activated starter, such as a winding shaft attached to a spring, or a combination of said starter and a motor. In alternate embodiments, the torque-supplying device is an electrically activated starter or a combination of said starter and a motor.

With reference to FIGS. 3, 4a, and 4b, as the controller assembly (114) rotates, the controllers (122) pass through the spacing intervals separating the plurality of field coils (110) and the plurality of magnets (112). During the time that each particular controller (122) passes through a particular spacing interval, a magnetic field, or flux, is generated between the field coil assembly (132), that controller (122), and the magnet (112). As the controller (122) is rotated through the spacing interval, the first and second magnetic sections (126, 130) of the controller (122) sweep past the perimeter of the wire coil (134). Accordingly, the location and intensity of the magnetic flux changes, and a voltage is induced in the wire coil (134). Further, because an electric load is applied to the wire coil (134), electric current is generated and is drawn from the wire coil (134) through the set of lead wires (not shown).

As electric current flows through the wire coil (134), a magnetic field having a first pole and a second pole is induced around the wire coil (134). The first pole is located on a side of the wire coil (134) nearest the spacing interval, and the second pole is located on a side of the wire coil substantially opposite of the first pole. Further, during the time that each particular controller passes through the spacing interval, the first pole is formed on the controller (122). Note that a direction of a polarity of the wire coil's (134) magnetic field is counter to a direction of a polarity of the magnetic field existent between the magnets (112), and, hence, the magnetic field induced around the wire coil (134) is referred to herein as a counter-magnetic field.

Attractive and repulsive forces between the poles of counter-magnetic field and poles of the magnets' (112) magnetic field causes the controller (120) to be pushed sideways away from the wire coil (134). Herein, these attractive and repulsive forces are referred to as counterforce. The counterforce causes forward rotational motion in the controller assembly (114), thereby transmitting torque to the drive shaft (116). Advantageously, an input torque required to maintain operation of the converter (100) is decreased. Further, said counter-magnetic field is absorbed by the controller (122) and transformed back into its original state.

Further, magnetic flux of the counter-magnetic field is discharged through the controller (122) as well as absorbed through the controller (122) in accordance with an amount of electric current generated, and, hence, with an amount of electric load applied to the wire coil (134). Accordingly, as the amount of electric load is increased, the forward rotational motion of the controller assembly increases, further decreasing the required input torque. Advantageously, in an embodiment where sufficient counterforce is generated and/or sufficient electric load is applied, the input torque is not required to maintain a momentum of the controller assembly (114), and output torque may be supplied from the converter (100) to a motor (not shown) operatively connected to the pulley (118). Accordingly, in said embodiment, the converter (100) outputs both electric current and torque, and, thus, provides usable electrical and mechanical energy.

Referring to FIGS. 2b and 4a, upper and lower surfaces of the first and second magnetic sections (126, 130) are formed in a substantially trapezoidal shape, with a shorter substantially parallel side of each surface facing toward the controller plate (120) and a longer substantially parallel side of the surfaces facing away from the controller plate (120). Further, upper and lower surfaces of the second magnetic section (130) are larger than upper and lower surfaces of the first magnetic section (126). Advantageously, such an arrangement ensures that as the controller (122) is rotated through a particular spacing interval, the first magnetic section (126) and the second magnetic section (130) both remain between the field coil assembly (110) and the magnet (112) for substantially equal amounts of time. Thus, the magnetic field, and, hence, the counter-magnetic field, may be generated for a long enough period of time to produce sufficient counterforce on the controller (122).

Referring to FIG. 3, note that a number of controllers (122) provided in the controller assembly (114) is greater than a number of magnets (112), and, hence, a number of field coil assemblies (132) provided in the converter (100). Accordingly, sufficient counter-magnetization is produced in the controller assembly (114) to maintain the forward rotational motion of the converter (100). Advantageously, an input torque required to maintain operation of the converter (100) is decreased.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An energy producing magnetic converter, comprising:
    a housing;
    a plurality of field coil assemblies disposed on a first surface of the housing;
    a plurality of magnets disposed on a second surface of the housing opposite of and aligned with the plurality of field coil assemblies; and
    a controller assembly rotatably secured to the housing and positioned between the plurality of field coil assemblies and the plurality of magnets,
    wherein, upon application of an electric load to the plurality of field coil assemblies, a rotation of the controller assembly relative to the plurality of field coil assemblies and the plurality of magnets induces at least one counter-magnetic field for generating an electric current.

2. The energy producing magnetic converter of claim 1, the housing comprising:
    a plurality of housing brackets;
    a first plate secured to and supported by the plurality of housing brackets; and
    a second plate secured to and supported by the plurality of housing brackets,
    wherein, the plurality of field coil assemblies is disposed on the first plate, and the plurality of magnets is disposed on the second plate.

3. The energy producing magnetic converter of claim 1, wherein each of the plurality of magnets is a substantially horse-shoe shaped permanent magnet.

4. The energy producing magnetic converter of claim 1, wherein each magnet of the plurality of magnets is aligned with a corresponding field coil assembly of the plurality of field coil assemblies and is separated from the corresponding field coil assembly by a spacing interval.

5. The energy producing magnetic converter of claim 4, the controller assembly comprising:
    a controller plate; and
    a plurality of controllers disposed along a perimeter of the controller plate, wherein each of the plurality of controllers is arranged to pass through the spacing interval.

6. The energy producing magnetic converter of claim 5, each of the plurality of controllers comprising:
    a first spacer having a first surface secured to the controller plate;
    a first magnetic section having a first surface secured to a second surface of the first spacer;
    a second spacer having a first surface secured to a second surface of the first magnetic section; and
    a second magnetic section secured to a second surface of the second spacer.

7. The energy producing magnetic converter of claim 6, wherein upper and lower surfaces of the first and second magnetic sections are formed in a substantially trapezoidal shape.

8. The energy producing magnetic converter of claim 6, wherein the first and second magnetic sections are formed from steel.

9. The energy producing magnetic converter of claim 6, wherein the first and second spacers are formed from a non-magnetic material.

10. The energy producing magnetic converter of claim 9, wherein the first and second spacers are formed of one selected from brass, aluminum, and hard plastic.

11. The energy producing magnetic converter of claim 6, each of the plurality of field coil assemblies comprising:
    a wire coil; and
    support brackets disposed on opposing faces of the wire coil, wherein the support brackets are secured to the first surface of the housing.

12. The energy producing magnetic converter of claim 11, wherein, during the rotation of the controller assembly, each of the controllers is arranged to pass through the spacing interval between each magnet and the corresponding field coil assembly, and the first and second magnetic sections of each of the controllers are arranged to pass across respectively first and second legs of each magnet and to pass outboard a perimeter of the wire coil of the corresponding field coil assembly.

13. The energy producing magnetic converter of claim 11, wherein, during the rotation of the controller assembly, each of the controllers is arranged to pass through the spacing interval between each magnet and the corresponding field coil assembly, and the first spacer of each of the controllers is arranged to pass outboard of each magnet and the corresponding field coil assembly, and the second spacer of each of the controllers is arranged to pass across the wire coil of the corresponding field coil assembly.

14. A magnetic converter system, comprising:
    a plurality of field coil assemblies;
    a plurality of magnets, each magnet of the plurality of magnets being positioned opposite of and separated from a corresponding field coil assembly of the plurality of field coil assemblies by a spacing interval;

a controller assembly having a plurality of controllers, each controller of the plurality of controllers being arranged to pass through the spacing interval between each magnet and the corresponding field coil assembly; and wherein, during a rotation of the controller assembly, a plurality of counter-magnetic fields generated substantially on the plurality of controllers as the plurality of controllers pass through the spacing interval between each magnet and the corresponding field coil assembly generates sufficient counterforce to provide and maintain forward rotational motion to the controller assembly, and wherein the maintaining of the forward rotational motion generates an output torque of the magnetic converter system.

15. The magnetic converter system of claim 14, wherein a drive shaft having a pulley is disposed along a centrally defined axis of the controller assembly, and wherein the output torque is drawn from the drive shaft using the pulley.

16. The magnetic converter system of claim 14, each of the plurality of controllers comprising:

a first spacer;

a second spacer;

a first magnetic section secured between the first spacer and the second spacer; and a second magnetic section secured outboard of the second spacer, wherein the first spacer and the second spacer are formed from a non-magnetic material.

17. The magnetic converter system of claim 16, wherein upper and lower surfaces of the first and second magnetic sections are formed in a substantially trapezoidal shape.

18. The magnetic converter system of claim 14, wherein a number of controllers in the plurality of controllers is greater than a number of field coil assemblies included in the plurality of field coil assemblies and a number of magnets included in the plurality of magnets.

19. The magnetic converter system of claim 14, wherein, during the rotation of the controller assembly, each controller of the plurality controllers is separated from each magnet by a first separation space and from the corresponding field coil assembly by a second separation space as the controller passes through the spacing interval.

20. A method for generating usable electrical energy and usable mechanical energy of a magnetic converter, comprising:

rotating a plurality of controllers secured to a controller plate of the magnetic converter between a field coil assembly and an opposing magnet of the magnetic converter;

utilizing a counter-magnetic field generated on each controller of the plurality of controllers to produce sufficient counterforce to maintain forward rotational motion of the controller plate and the plurality of controllers;

wherein maintaining forward rotational motion of the controller plate and the plurality of controllers generates usable mechanical energy of the magnetic converter, and wherein application of an electric load to the field coil assembly generates usable electrical energy of the magnetic converter.

\* \* \* \* \*